United States Patent
Quaglia et al.

(10) Patent No.: US 11,039,308 B2
(45) Date of Patent: Jun. 15, 2021

(54) WIRELESS COMMUNICATION DEVICE FOR COMMUNICATION IN A WIRELESS COMMUNICATION NETWORK

(71) Applicant: Huawei Technologies Co., Ltd., Shenzhen (CN)

(72) Inventors: Elizabeth Quaglia, Munich (DE); Benjamin Smyth, Munich (DE); Tsz Hon Yuen, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 90 days.

(21) Appl. No.: 16/577,842

(22) Filed: Sep. 20, 2019

(65) Prior Publication Data

US 2020/0015073 A1    Jan. 9, 2020
US 2020/0382949 A9    Dec. 3, 2020

Related U.S. Application Data

(63) Continuation of application No. PCT/CN2018/079457, filed on Mar. 19, 2018.

(30) Foreign Application Priority Data

Mar. 20, 2017 (EP) .................................... 17161898

(51) Int. Cl.
*H04W 12/00*     (2021.01)
*H04W 12/03*     (2021.01)
(Continued)

(52) U.S. Cl.
CPC .......... *H04W 12/03* (2021.01); *H04L 9/0643* (2013.01); *H04L 9/0825* (2013.01);
(Continued)

(58) Field of Classification Search
CPC ...... H04W 12/03; H04W 12/50; H04W 12/55
See application file for complete search history.

(56) References Cited

U.S. PATENT DOCUMENTS 7,234,059 B1    6/2007    Beaver et al.
7,454,418 B1    11/2008    Wang
(Continued)

FOREIGN PATENT DOCUMENTS

CN    102480727 A    5/2012
CN    104917618 A    9/2015
(Continued)

OTHER PUBLICATIONS

Tomita et al., "Sequential Aggregate Authentication Codes with Information Theoretic Security," 2016 Annual Conference on Information Science and Systems (CISS) pp. 1-6 (2016).
(Continued)

*Primary Examiner* — Richard A McCoy
(74) *Attorney, Agent, or Firm* — Leydig, Voit & Mayer, Ltd.

(57) ABSTRACT

Embodiments relate to a wireless communication device of a group of wireless communication devices configured to communicate with a base station, the wireless communication device comprising a transceiver configured to receive a token from the base station and a processor configured to generate a first data structure on the basis of a function of the token and of a key $k_i$ of the wireless communication device and a second data structure comprising an identity $id_i$ of the wireless communication device, wherein the transceiver is further configured to broadcast the first data structure and the second data structure to the group of wireless communication devices and the base station.

14 Claims, 3 Drawing Sheets

(51) Int. Cl.
*H04L 9/06* (2006.01)
*H04L 9/08* (2006.01)
*H04L 9/32* (2006.01)
*H04W 12/06* (2021.01)
*H04W 12/041* (2021.01)
*H04W 12/55* (2021.01)

(52) U.S. Cl.
CPC ......... *H04L 9/3242* (2013.01); *H04W 12/041* (2021.01); *H04W 12/06* (2013.01); *H04W 12/55* (2021.01)

(56) References Cited

U.S. PATENT DOCUMENTS

| | | | | |
|---|---|---|---|---|
| 7,590,236 | B1* | 9/2009 | Boneh | H04L 63/0428 380/277 |
| 8,108,678 | B1* | 1/2012 | Boyen | H04L 9/0847 713/176 |
| 8,966,252 | B2* | 2/2015 | Mutka | H04L 63/08 713/168 |
| 9,179,305 | B2 | 11/2015 | Haddad et al. | |
| 2003/0081785 | A1* | 5/2003 | Boneh | H04L 9/0847 380/277 |
| 2004/0131191 | A1* | 7/2004 | Chen | H04L 9/321 380/282 |
| 2005/0094806 | A1* | 5/2005 | Jao | G06F 7/725 380/30 |
| 2005/0262353 | A1* | 11/2005 | Gentry | H04L 9/3073 713/176 |
| 2006/0129800 | A1* | 6/2006 | Lauter | H04L 9/3247 713/151 |
| 2006/0177051 | A1* | 8/2006 | Lauter | H04L 9/3247 380/28 |
| 2009/0180612 | A1* | 7/2009 | Leu | H04N 7/17318 380/200 |
| 2011/0302412 | A1* | 12/2011 | Deng | H04L 63/0421 713/159 |
| 2012/0159153 | A1* | 6/2012 | Shim | H04L 9/3073 713/155 |
| 2012/0324240 | A1* | 12/2012 | Hattori | H04L 9/3073 713/189 |
| 2014/0281491 | A1* | 9/2014 | Zaverucha | H04L 63/0421 713/155 |
| 2016/0323275 | A1 | 11/2016 | Choi et al. | |

FOREIGN PATENT DOCUMENTS

| | | |
|---|---|---|
| CN | 104967597 A | 10/2015 |
| CN | 104980270 A | 10/2015 |
| CN | 105069358 A | 11/2015 |
| CN | 102684874 B | 4/2016 |
| WO | 2016077013 A1 | 5/2016 |

OTHER PUBLICATIONS

Qin et al., "An Efficient Identity-Based Key Management Scheme for Wireless Sensor Networks Using the Bloom Filter," XP55386447, pp. 17937-17951 (Sep. 26, 2014).

Jiang et al., "An Efficient Anonymous Batch Authentication Scheme Based on HMAC for VANETs," IEEE Transactions on Intelligent Transportation Systems, vol. 17, No. 8, XP011618104, pp. 2193-2204, Institute of Electrical and Electronics Engineers, New York, New York (Aug. 2016).

Malhi et al., "Privacy-preserving Authentication Framework Using Bloom Filter for Secure Vehicular Communications," XP036011689, pp. 433-453 (Sep. 7, 2015).

Katz et al., "Aggregate Message Authentication Codes," pp. 1-13 (2008).

Gilbert et al., "HB#: Increasing the Security and Efficiency of HB+," pp. 1-22, Eurocrypt (2008).

Boneh et al., "Aggregate and Verifiably Encrypted Signatures from Bilinear Maps," pp. 416-432, International Association for Cryptologic Research, Eurocrypt (2003).

Lu et al., "Sequential Aggregate Signatures and Multisignatures without Random Oracles," pp. 1-21, Eurocrypt (2006).

Bernstein et al., "High-speed High-security Signatures," pp. 77-89 (Aug. 14, 2012).

* cited by examiner

WIRELESS COMMUNICATION DEVICE FOR COMMUNICATION IN A WIRELESS COMMUNICATION NETWORK

CROSS-REFERENCE TO RELATED APPLICATIONS

This application is a continuation of International Application No. PCT/CN2018/079457, filed on Mar. 19, 2018, which claims priority to European Patent Application No. EP17161898.6, filed on Mar. 20, 2017. The disclosures of the aforementioned applications are hereby incorporated by reference in their entireties.

TECHNICAL FIELD

In general, embodiments of the present invention relate to security in wireless communication systems. In particular, the embodiments relate to a wireless communication device for communication in a wireless communication network.

BACKGROUND

In an all-connected world, the Internet of Things (IoT) is becoming more and more important. A lot of devices can establish contact and communicate with each other, and the security of such communications is of paramount importance. Typically, in such an environment, there is a disparity between the resources associated to each device, for instance power and memory, which can range from large devices e.g., base stations or fixed readers, to small devices e.g., mobile nodes or sensors. Developing security protocols which successfully take such disparity into consideration is very important in order to allow a secure communication among different devices.

For the development of the IoT, several proposals for Future Network Architectures (FNA) are being put forth, and a clear common trait among such proposals is the importance of the identities of the communication devices. The basic idea of such proposals is to associate to each device an identity, and, therefore, the field of Identity-Based Cryptography (IBC) can play a key role.

The problem of authenticating a group of entities in an efficient way has also been studied in the prior art. In particular, the idea of aggregating signatures, i.e., putting together several signatures so that only a single signature should be verified, has emerged both in the symmetric and asymmetric setting of cryptography.

In the work "Aggregate message authentication codes", Topics in Cryptology—CT-RSA (2008) by Katz and Lindell, aggregate message authentication codes (MAC) are proposed. The basic idea is to have multiple MAC tags, computed by (possibly) different senders on multiple (possibly different) messages, which can be aggregated into a shorter tag that can still be verified by a recipient who shares a distinct key with each sender.

In the work "HB #: Increasing the Security and Efficiency of HB+", Eurocrypt (2008) by Gilbert H. et al., symmetric solutions are discussed and a lightweight three-pass symmetric key authentication protocol is introduced that extends a protocol by Hopper and Blum (HB) to fix a security problem. Furthermore, the aggregate message authentication codes (MAC), as discussed above, belong to the symmetric solutions as well.

Asymmetric solutions can make use of public-key aggregate signatures as presented, for example, in the work "Aggregate and verifiably encrypted signatures from bilinear maps", Eurocrypt (2003), by Boneh et al. and in the work "Sequential aggregate signatures and multi-signatures without random oracles", Eurocrypt (2006), by Lu et al. The verifying entity or base station only needs to know the public key of the senders (instead of a shared key between the verifier and each sender). Most of the existing solutions rely on bilinear pairings and, therefore, are inefficient and inadequate for the IoT setting.

Although the above mentioned solutions address the problem of authenticating a group of resource-constrained devices to a verifying entity or base station with larger resources, they, however, are not group authentication schemes, they are inefficient, and they are not identity-based in the case of symmetric solutions.

Therefore, there is a need for improved devices for communication in a wireless communication network, which, in particular, allow to solve the problem of authenticating a group of resource-constrained devices to a base station with larger resources, where all the entities are equipped with identities, and are immerged in an identity-based cryptography (IBC) infrastructure.

SUMMARY

It is an object of the embodiments to provide for improved devices for communication in a wireless communication network.

The foregoing and other objects are achieved by the subject matter of the independent claims. Further implementation forms are apparent from the dependent claims, the description and the figures.

According to a first aspect, an embodiment relates to a wireless communication device of a group of wireless communication devices configured to communicate with a base station, the wireless communication device comprising a transceiver configured to receive a token from the base station, and a processor configured to generate a first data structure on the basis of a function of the token and of a key $k_i$ of the wireless communication device and a second data structure comprising an identity $id_i$ of the wireless communication device, wherein the transceiver is further configured to broadcast the first data structure and the second data structure to the group of wireless communication devices and the base station.

In a first possible implementation form of the wireless communication device according to the first aspect as such, the function of the token and of the key $k_i$ of the wireless communication device has a uniform output distribution, i.e. an output that is looking random.

In a second possible implementation form of the wireless communication device according to the first aspect as such or the first implementation form thereof, at least one of the first data structure or modified first data structure is a Bloom filter.

In a third possible implementation form of the wireless communication device according to the first aspect as such or the first or second implementation form thereof, the processor is further configured to compute the key $k_i$ of the wireless communication device on the basis of the following equation:

$$k_i = H'(e(H(id_{BS}), H(id_i)^s), r),$$

wherein r is the token, H' and H are cryptographic hash functions, $id_{BS}$ is an identity of the base station, e is a bilinear pairing function, and s is a master key. In an implementation form, s can be a master key available to the base station.

In a fourth possible implementation form of the wireless communication device according to the second implementation form of the first aspect, the length of the Bloom filter m, the number L of the wireless communication devices of the group of wireless communication devices, and the number n of cryptographic hash functions for adding an element to the Bloom filter are related by the following equation:

$$2^{-n}=(0.6185)^{m/L},$$

In a fifth possible implementation form of the wireless communication device according to the first aspect as such or the first or second implementation form thereof, the processor is further configured to compute the key $k_i$ of the wireless communication device on the basis of the following equation:

$$k_i=tsP,$$

wherein t is a random integer, P is a public parameter, tP is the token, (x, (P, Y=xP)) is a key pair, s=r+xH(R, $id_i$), H is a cryptographic hash function, and $r \in_R Z_q^*$, R=rP.

In a sixth possible implementation form of the wireless communication device according to the first aspect as such or the first or second implementation form thereof, the processor is further configured to compute the key $k_i$ of the wireless communication device on the basis of the following equation:

$$k_i=H'(sR'+sH(R',id_{BS})Y,t),$$

wherein (R, s) is a private key of the wireless communication device, (R', s') is a private key of the base station, t is the token, $r \in_R Z_q^*$, R=rP, (x, (P, Y=xP)) is a key pair, s=r+xH(R, $id_j$), and H' and H are cryptographic hash functions.

According to a second aspect, an embodiment relates to a wireless communication device of a group of wireless communication devices configured to communicate with a base station and the group of wireless communication devices, the wireless communication device comprising a transceiver configured to receive a token from the base station, a first data structure generated on the basis of a function of the token and of a key $k_i$ of a further wireless communication device and a second data structure comprising an identity $id_i$ of the further wireless communication device, and a processor configured to add a data element based on a function of the token and of a key $k_j$ of the wireless communication device to the first data structure, and to add an identity $id_j$ of the wireless communication device to the second data structure for obtaining a modified first data structure and a modified second data structure, wherein the transceiver is further configured to broadcast the modified first data structure and the modified second data structure to the group of wireless communication devices and the base station.

In a first possible implementation form of the wireless communication device according to the second aspect as such, the function of the token and of the key $k_j$ of the wireless communication device has a uniform output distribution.

In a second possible implementation form of the wireless communication device according to the second aspect as such or the first implementation form thereof, the first data structure is a Bloom filter.

In a third possible implementation form of the wireless communication device according to the second aspect as such or the first or second implementation form thereof, the processor is further configured to compute the key $k_j$ of the wireless communication device on the basis of the following equation:

$$k_j=H'(e(H(id_B),H(id)^s),r),$$

wherein r is the token, H' and H are cryptographic hash functions, $id_{BS}$ is an identity of the base station, e is a bilinear pairing function, and s is a master key.

In a fourth possible implementation form of the wireless communication device according to the second aspect as such or the first or second implementation form thereof, the processor is further configured to compute the key $k_j$ of the wireless communication device on the basis of the following equation:

$$k_j=tsP,$$

wherein t is an integer, P is a public parameter, tP is the token, (x, (P, Y=xP)) is a key pair, s=r+xH(R, $id_j$), H is a cryptographic hash function, and $r \in_R Z_q^*$, R=rP.

In a fifth possible implementation form of the wireless communication device according to the second aspect as such or the first or second implementation form thereof, the processor is further configured to compute the key $k_j$ of the wireless communication device on the basis of the following equation:

$$k_j=H'(sR'+sH(R',id_{BS})Y,t),$$

wherein (R, s) is a private key of the wireless communication device, (R', s') is a private key of the base station, t is the token, $r \in_R Z_q^*$, R=rP, (x, (P, Y=xP)) is a key pair, s=r+xH(R, $id_j$), and H' and H are cryptographic hash functions.

According to a third aspect, an embodiment relates to a base station configured to communicate with at least one wireless communication device of a group of wireless communication devices in a wireless communication network, the base station comprising a transceiver configured to receive a first data structure and a second data structure generated by the at least one wireless communication device, wherein the first data structure is based on a function of a token provided by the base station and of a key $k_i$ of the at least one wireless communication device, and wherein the second data structure comprises an identity $id_i$ of the at least one wireless communication device, and a processor configured to derive the key $k_i$ of the at least one wireless communication device on the basis of the second data structure and to authenticate the at least one wireless communication device on the basis of the key $k_i$ and of the first data structure of the at least one wireless communication device.

In a first possible implementation form of the base station according to the third aspect as such, the processor is further configured to derive the key $k_i$ of the at least one wireless communication device on the basis of the following equation:

$$k_i=H'(e(H(id_{BS})^s,H(id_i)),r),$$

wherein r is the token, H' and H are cryptographic hash functions, $id_{BS}$ is an identity of the base station, and s is a master key.

In a second possible implementation form of the base station according to the third aspect as such, the processor is further configured to derive the key $k_i$ of the at least one wireless communication device on the basis of the following equation:

$$k_i=tR+tH(R,id_i)Y,$$

wherein t is an integer, P is a public parameter, tP is the token, (x, (P, Y=xP)) is a key pair, s=r+xH(R, $id_i$), H is a cryptographic hash function, and $r \in_R Z_q^*$, R=rP.

In a third possible implementation form of the base station according to the third aspect as such, the processor is further configured to derive the key $k_i$ of the at least one wireless communication device on the basis of the following equation:

$$k_i = H'(s'R + s'H(R, id_i)Y, t),$$

wherein (R, s) is a private key of the at least one wireless communication device, (R', s') is a private key of the base station, t is the token, $r \in_R Z_q^*$, R=rP, (x, (P, Y=xP)) is a key pair, s=r+xH(R, $id_i$), and H' and H are cryptographic hash functions.

The embodiments can be implemented in hardware and/or software.

BRIEF DESCRIPTION OF THE DRAWINGS

Further embodiments of the invention will be described with respect to the following figures, wherein.

DETAILED DESCRIPTION OF THE EMBODIMENTS

In the following description, reference is made to the accompanying drawings, which form part of the disclosure, and in which are shown, by way of illustration, specific aspects in which embodiments of the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
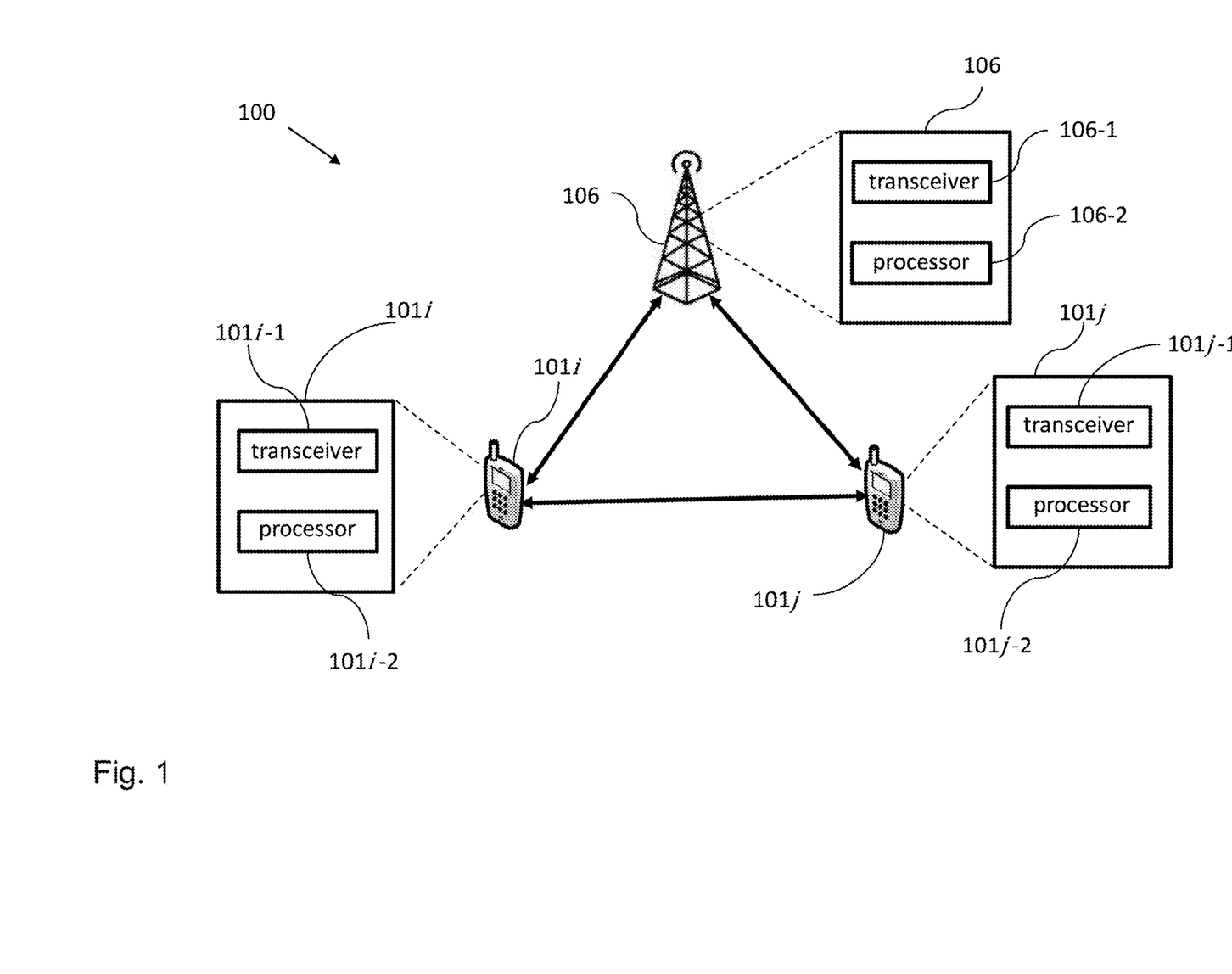
FIG. 1 shows a schematic diagram of a wireless communication system comprising a wireless communication device, a further wireless communication device, and a base station according to embodiments of the invention.

FIG. 1 shows a schematic diagram of a wireless communication system 100 comprising a wireless communication device 101*i*, a further wireless communication device 101*j*, and a base station 106 according to embodiments of the invention.

The wireless communication device 101*i* is configured to communicate with the base station 106 and the wireless communication device 101*j*. The wireless communication device 101*i* comprises a transceiver 101*i*-1 configured to receive a token from the base station 106, and a processor 101*i*-2 configured to generate a first data structure 102*a* (see FIG. 1*a* (b)) on the basis of a function of the token and of a key $k_i$ of the wireless communication device 101*i*, and a second data structure comprising an identity $id_i$ of the wireless communication device 101*i*. The transceiver 101*i*-1 is further configured to broadcast the first data structure 102*a* and the second data structure to the further wireless communication device 101*j* and the base station 106.

The further wireless communication device 101*j* is configured to communicate with the base station 106 and the wireless communication device 101*i*. The further wireless communication device 101*j* comprises a transceiver 101*j*-1 configured to receive the token from the base station 106, the first data structure 102*a* generated on the basis of the function of the token and of the key $k_i$ of the wireless communication device 101*i*, and the second data structure comprising the identity $id_i$ of the wireless communication device 101*i*, and a processor 101*j*-2 configured to add a data element based on a function of the token and of a key $k_j$ of the further wireless communication device 101*j* to the first data structure 102*a*, and to add an identity $id_j$ of the further wireless communication device 101*j* to the second data structure for obtaining a modified first data structure and a modified second data structure. The transceiver 101*j*-1 is further configured to broadcast the modified first data structure and the modified second data structure to the wireless communication device 101*i* and the base station 106.

The base station 106 is configured to communicate with the wireless communication device 101*i* and the further wireless communication device 101*j*. The base station 106 comprises a transceiver 106-1 configured to receive the first data structure 102*a* and the second data structure generated by the wireless communication device 101*i* (or the modified first data structure and the modified second data structure generated by the further wireless communication device 101*j*), wherein the first data structure 102*a* is based on the function of the token provided by the base station 106 and of the key $k_i$ of the wireless communication device 101*i*, and wherein the second data structure comprises the identity $id_i$ of the wireless communication device 101*i*, and a processor 106-2 configured to derive the key $k_i$ of the wireless communication device 101*i* on the basis of the second data structure and to authenticate the wireless communication device 101*i* on the basis of the key $k_i$ and of the first data structure 102*a* of the wireless communication device 101*i*.

In an embodiment, the function applied to the token and the key $k_i$ of the wireless communication device 101*i* has a uniform output distribution and, preferably, is collision resistant, namely it is difficult to find two different tokens that result in the same output.

In an embodiment, the first data structure 102*a* is a Bloom Filter (BF) (see FIG. 1*a*), which is a space-efficient data structure that can be used to perform a set-membership test, wherein the set-membership test allows to check if, for example, the wireless communication device 101*i* is a legitimate device, i.e., an identifiable wireless communication device that shares a secret key, e.g. $k_i$, with the base station 106.

Figure 1A:
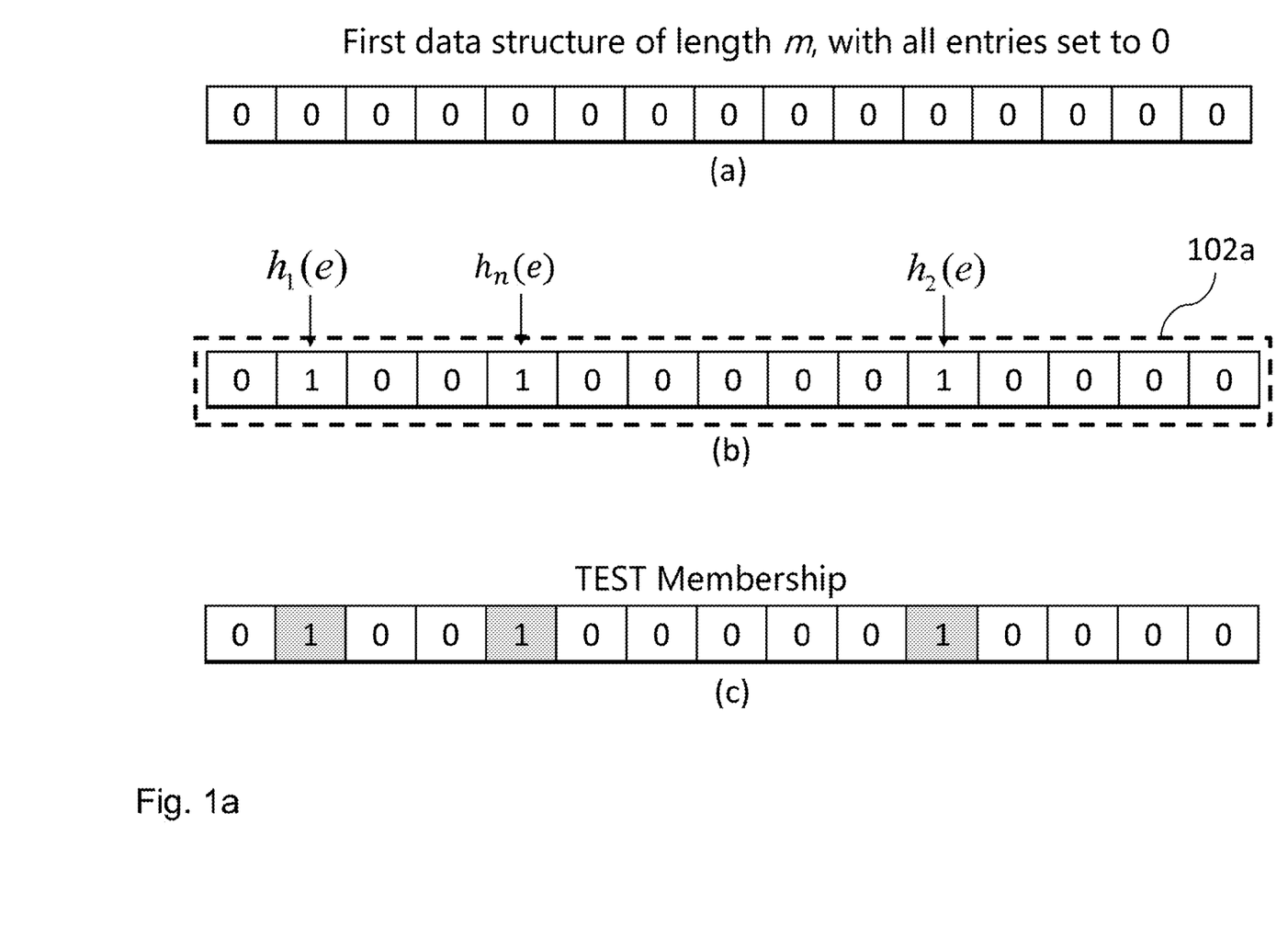
FIG. 1a shows an exemplary first data structure according to an embodiment of the invention.

In particular, a BF is an array of length m, with all entries set to 0 (see FIG. 1*a* (a)). To perform the set-membership test, the processor 101*i*-2 can be configured to select n hash functions mapping elements from the set to values 1 to m uniformly at random (see FIG. 1*a* (b)). In embodiments of the invention, n is much smaller than m.

Moreover, in order to add an element e to the BF, the processor 101*i*-2 can be configured to compute the value of all hash functions on e, and to set the entry of the BF equal to one accordingly (see FIG. 1*a* (b)). Furthermore, for testing the set-membership of e, the processor 101*i*-2 can be configured to re-compute the hashes (see FIG. 1a (c)): if at least one value corresponds to a 0-entry, then e is not in the BF; and if all values correspond to 1-entries, then e may be in the BF, i.e., false positives are possible.

In embodiments of the invention, the false positive rate of the BF can be kept low in order to avoid attempts from an adversary to get authenticated to the base station 106 while not being authorized to. This can be ensured by selecting the parameters (m, n, L) defining the BF accordingly, wherein m is the length of the BF, n is the number of hashes for adding an element to the BF, and L is the number of the wireless communication devices authenticating to the base station 106. In an embodiment, the number of hash functions n to minimize the probability of false positives is given by the following equation:

$$2^{-n}=(0.6185)^{m/L}.$$

In embodiments of the invention, in order to maintain the secrecy of the key $k_i$ added to the BF, cryptographic hash functions can be used with the Bloom Filter.

In embodiments of the invention, the processor 101i-2 can be configured to use, for example, the parameters (m, n, L) shown in table 1 in order to define the BF.

TABLE 1

Parameters (m, n, L) defining the BF according to an embodiment.

| n | m | L |
|---|---|---|
| 9 | 128 | 15 |
| 18 | 256 | 50 |

Embodiments of the invention making use of BFs as first data structures have the advantage of providing very efficient data structures in terms of space, since the time to add elements or test membership is constant, namely it does not depend on the number of elements in the BF or the set. Moreover, this has the advantage of improving the performance of the authentication protocol. Another advantage of using a BF is due to the fact that there are no false negatives, namely the membership test for the secret values, e.g., keys $k_i$ and $k_j$, shared between the wireless communication devices 101i, 101j and the base station 106, and which have been added to the Bloom Filter, will always succeed.

In another embodiment, the first data structure 102a is an aggregate message authentication code (MAC).

In an embodiment of the invention, the processor 106-2 of the base station 106 is configured to generate by means of a Private Key Generator (PKG) a pair of master keys (msk, mpk)=(s, (g, $g^s$)). In this embodiment, the wireless communication devices 101i, 101j, and the base station 106 comprise a private key $H(id_i)^s$ provided by the PKG, wherein H is a cryptographic hash function. In this embodiment, the following steps take place:

1st step: the base station 106 broadcasts the token r;

$2^{nd}$ step: in order to authenticate, the processor 101i-2 of the wireless communication device 101i computes its key $k_i$ on the basis of the following equation:

$$k_i=H'(e(H(id_{BS}),H(id_i)^s),r),$$

wherein r is the token, H' and H are cryptographic hash functions, $id_{BS}$ is the identity of the base station 106, e is a bilinear pairing function, and s is a master key. For example, s is the master secret key hold by the base station 106. The processor 101i-2 of the wireless communication device 101i is configured to add $k_i$ to the first data structure 102a, e.g., the BF, to append the identity $id_i$ of the wireless communication device 101i to the second data structure, and to pass the two arrays or data structures (the BF and the one containing the identities) to the further wireless communication device 101j.

$3^{rd}$ step: in order to verify whether the wireless communication devices that populate the BF are legitimate, for each identity $id_{i/j}$ in the second data structure, the processor 106-2 of the base station 106 computes the key $k_{i/j}$ on the basis of the following equation:

$$k_{i/j}=H'(e(H(id_{BS})^s,H(id_{i/j})),r),$$

wherein H' and H are cryptographic hash functions, $id_{BS}$ is the identity of the base station 106, and s is the key of the pair of master keys. Then, the processor 106-2 checks if the key $k_{i/j}$ belongs to the BF. Namely, if any of the entries of the BF is 0, then the key $k_{i/j}$ is rejected, and if all and only those entries are 1, then the key $k_{i/j}$ is accepted.

This embodiment has the advantage of introducing a separate PKG, which decouples the role of the base station 106 and of the master key holder, which can be useful in many scenarios (e.g., group authentication between a base station and mobile nodes). Moreover, this embodiment maintains the lightweight performance in terms of communication, while adding some computational costs due to the use of pairings.

In another embodiment of the invention the PKG generates a master key pair (msk, mpk)=(x, (P, Y=xP)), wherein P is a public parameter. In this embodiment, each wireless communication device 101i/101j is equipped with an identity $id_{i/j}$ and the private key (R, s) such that:

$$r \in_R Z_q^*, R=rP \text{ and}$$

$$s=r+xH(R,id_{i/j}),$$

wherein H is a cryptographic hash function. In this embodiment, the following steps take place:

$1^{st}$ step: the base station 106 broadcasts the token tP, wherein t is an integer chosen uniformly at random;

$2^{nd}$ step: in order to authenticate, the processor 101i-2 of the wireless communication device 101i with identity $id_i$ computes its key $k_i$ on the basis of the following equation:

$$k_i=tsP.$$

Then, the processor 101i-2 of the wireless communication device 101i adds the key $k_i$ to the BF, and appends its identity ($id_i$, R) to the second data structure, and passes the two arrays (the first data structure 102a, in this embodiment the BF, and the second data structure containing the identities) to the further wireless communication device 101j;

$3^{rd}$ step: in order to verify whether the wireless communication devices 101i and 101j that have populated the BF are legitimate, the processor 106-2 of the base station 106, for each ($id_{i/j}$, R) appended in the second data structure, computes the key $k_{i/j}$ of the wireless communication device 101i/j on the basis of the following equation:

$$k_{i/j}=tR+tH(R,id_{i/j})Y,$$

and checks if it belongs to the first data structure 102a, which in this embodiment is a BF. In other words, if any of the entries of the BF is 0, then the key $k_{i/j}$ is rejected, and if all and only those entries are 1, then the key $k_{i/j}$ is accepted.

This embodiment of the invention provides the advantage of having a separate PKG, which decouples the role of the base station 106 and master key holder, and of recovering computation efficiency by eliminating the need for pairings. Communication costs are slightly increased since in the appended array devices have to transmit their identity together with their value R.

In another embodiment of the invention the PKG generates a master key pair (msk, mpk)=(x, (P, Y=xP)). In this embodiment, each wireless communication device 101$i$, 101$j$, and the base station 106 are equipped with the respective identities (id$_i$, id$_j$, and id$_{BS}$) and the private key (R, s) provided by the PKG in such a way that:

$$r \in_R Z_q^*, \text{ and}$$

$$s = r + xH(R, id_i),$$

wherein H' and H are cryptographic hash functions. In this embodiment, the following steps take place:

1$^{st}$ step: the transceiver 106-1 of the base station 106 broadcasts the token t. The base station 106 has a private key (R', s');

2$^{nd}$ step: in order to authenticate, the processor 101$i$-2 of the wireless communication device 101$i$ computes the key k$_i$ of the wireless communication device 101$i$ on the basis of the following equation:

$$k_i = H'(sR' + sH(R', id_{BS})Y, t).$$

Then, the processor 101$i$-2 adds k$_i$ to the BF, appends its identity (id$_i$, R) to the second data structure, and passes the two data structures (the BF and the one containing the identities) to the further wireless communication device 101$j$;

3$^{rd}$ step: in order to verify whether the wireless communication devices 101$i$ and 101$j$ are legitimate, the processor 106-2 of the base station 106, for each (id$_{i/j}$, R) in the second data structure, derives the key k$_{i/j}$ of the wireless communication device 101$i$/101$j$ on the basis of the following equation:

$$k_{i/j} = H'(s'R + s'H(R, id_{i/j})Y, t),$$

and checks if it belongs to the first data structure 102$a$, which in this embodiment is a BF. In other words, if any of the entries of the BF is 0, then the key k$_{i/j}$ is rejected, and if all and only those entries are 1, then the key k$_{i/j}$ is accepted.

This embodiment of the invention provides the advantage of having a separate PKG, which decouples the role of the base station 106 and of the master key holder, and of recovering computation efficiency by eliminating the need for pairings. Communication costs are slightly increased since in the first data structure 102$a$ and in the second data structure the wireless communication devices 101$i$ and 101$j$ should transmit their identities id$_i$ and id$_j$ together with their value R. Moreover, if there is any subsequent session with a new token t', then the wireless communication devices 101$i$ and 101$j$ and the base station 106 can simply recompute H' by changing the second input only. Therefore, the computation involved is minimized.

In another embodiment of the invention, the wireless communication devices 101$i$ and 101$j$ are a set of sensors which want to communicate with a local reader (e.g., in a smart home) and, in order to do so, should authenticate to the reader. In this embodiment, the nodes may be static, and the network topology would be typically known.

The aforementioned embodiments of the invention solve the problem of lightweight group authentication in a network in which the wireless communication devices 101$i$ and 101$j$ are equipped with identities. Moreover, embodiments of the invention advantageously overcome the limitations of prior art solutions since, simultaneously, they are lightweight, they handle group authentication and they are suitable for an identity-based setting.

Figure 2:
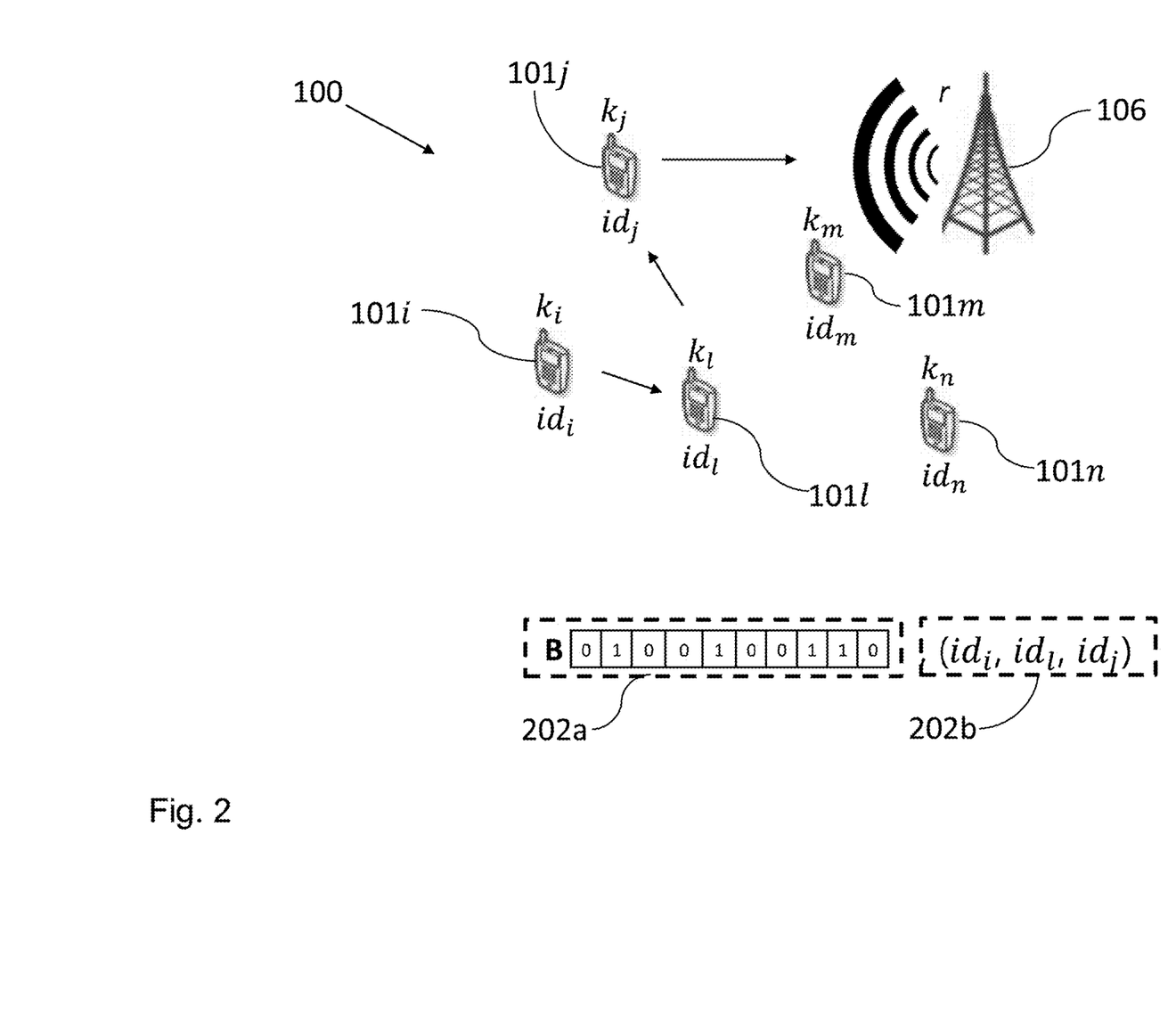
FIG. 2 shows a schematic diagram of a wireless communication system comprising a plurality of wireless communication devices, a base station, an exemplary modified first data structure and an exemplary modified second data structure according to embodiments of the invention.

FIG. 2 shows a schematic diagram of a wireless communication system 100 comprising a plurality of wireless communication devices 101$i$, 101$j$, 101$l$, 101$m$, 101$n$, and the base station 106, an exemplary modified first data structure 202$a$, and an exemplary modified second data structure 202$b$ according to embodiments of the invention.

In this embodiment of the invention, the base station 106 broadcasts the token r, which is received by the wireless communication devices 101$i$, 101$j$, 101$l$, 101$m$, and 101$n$. Then, the processor 101$i$-2 of the wireless communication device 101$i$ adds its key k$_i$ to the first data structure 102$a$, which in this embodiment is a BF, and appends its identity id$_i$ to the second data structure, and passes the first data structure 102$a$ and the second data structure to the wireless communication device 101$l$. Afterwards, the wireless communication device 101$l$, similarly to the wireless communication device 101$i$, adds its key k$_i$ to the first data structure 102$a$ and appends its identity id$_l$ to the second data structure. Then, the wireless communication device 101$j$, similarly to the wireless communication devices 101$i$ and 101$l$, adds its key k$_j$ to the BF 202$a$, so that the modified first data structure 202$a$ is obtained, and appends its identity id$_j$ to the second data structure 202$b$, so that the modified second data structure 202$b$ is obtained. Finally, the wireless communication device 101$j$ sends the modified first data structure 202$a$ and the modified second data structure 202$b$ to the base station 106.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A wireless communication device of a group of wireless communication devices configured to communicate with a base station, the wireless communication device comprising:
   a transceiver configured to receive a token from the base station; and
   a processor configured to generate a first data structure on the basis of a function of the token and of a key $k_i$ of the wireless communication device and a second data structure comprising an identity $id_i$ of the wireless communication device;
   wherein the transceiver is further configured to broadcast the first data structure and the second data structure to the group of wireless communication devices and the base station;
   wherein the processor is further configured to compute the key $k_i$ of the wireless communication device on the basis of the following equation:

$$k_i = H'(e(H(id_{BS}), H(id_i)^s), r)$$

wherein r is the token, H' and H are cryptographic hash functions, $id_{BS}$ is an identity of the base station, e is a bilinear pairing function, and s is a master key.

2. The wireless communication device of claim 1, wherein the function of the token and of the key $k_i$ of the wireless communication device has a uniform output distribution.

3. The wireless communication device of claim 1, wherein the first data structure is a Bloom filter.

4. The wireless communication device of claim 3, wherein the length of the Bloom filter m, the number L of the wireless communication devices of the group of wireless communication devices, and the number n of cryptographic hash functions for adding an element to the Bloom filter are related by the following equation:

$$2^{-n} = (0{,}6185)^{m/L}.$$

5. The wireless communication device of claim 1, wherein the processor is further configured to compute the key $k_i$ of the wireless communication device on the basis of the following equation:

$$k_i = tsP,$$

wherein t is a random integer, P is a public parameter, tP is the token, (x, (P, Y=xP)) is a key pair, s=r+xH(R, $id_i$), H is a cryptographic hash function, and $r \in_R Z_q^*$, R=rP.

6. The wireless communication device of claim 1, wherein the processor is further configured to compute the key $k_i$ of the wireless communication device on the basis of the following equation:

$$k_i = H'(sR' + sH(R', id_{BS})Y, t),$$

wherein (R, s) is a private key of the wireless communication device (101i), (R', s') is a private key of the base station, t is the token, $r \in_R Z_q^*$, R=rP, (x, (P, Y=xP)) is a key pair, s=r+xH(R, $id_i$), and H' and H are cryptographic hash functions.

7. A wireless communication device of a group of wireless communication devices configured to communicate with a base station and the group of wireless communication devices, the wireless communication device comprising:
   a transceiver configured to receive a token from the base station, a first data structure generated on the basis of a function of the token and of a key $k_j$ of a further wireless communication device and a second data structure comprising an identity $id_j$ of the further wireless communication device; and
   a processor configured to add a data element based on a function of the token and of a key $k_j$ of the wireless communication device to the first data structure,
   and to add an identity $id_j$ of the wireless communication device to the second data structure for obtaining a modified first data structure and a modified second data structure;
   wherein the transceiver is further configured to broadcast the modified first data structure and the modified second data structure to the group of wireless communication devices and the base station;

$$k_j = H'(e(H(id_{BS}), H(id_j)^s), r)$$

wherein r is the token, H' and H are cryptographic hash functions, $id_{BS}$ is an identity of the basestation, e is a bilinear pairing function, and s is a master key.

8. The wireless communication device of claim 7, wherein the function of the token and of the key $k_j$ of the wireless communication device has a uniform output distribution.

9. The wireless communication device of claim 7, wherein at least one of the first data structure or modified first data structure is a Bloom filter.

10. The wireless communication device of claim 7, wherein the processor is further configured to compute the key $k_j$ of the wireless communication device on the basis of the following equation:

$$k_j = tsP,$$

wherein t is an integer, P is a public parameter, tP is the token, (x, (P, Y=xP)) is a key pair, s=r+xH(R, $id_j$), H is a cryptographic hash function, and $r \in_R Z_q^*$, R=rP.

11. The wireless communication device of claim 7, wherein the processor is further configured to compute the key $k_j$ of the wireless communication device on the basis of the following equation:

$$k_j = H'(sR' + sH(R', id_{BS})Y, t),$$

wherein (R, s) is a private key of the wireless communication device, (R', s') is a private key of the base station, t is the token, $r \in_R Z_q^*$, R=rP, (x, (P, Y=xP)) is a key pair, s=r+xH(R, $id_j$), and H' and H are cryptographic hash functions.

12. A base station configured to communicate with at least one wireless communication device of a group of wireless communication devices in a wireless communication network, the base station comprising:
    a transceiver configured to receive a first data structure and a second data structure generated by the at least one wireless communication device,
    wherein the first data structure is based on a function of a token provided by the base station and of a key $k_i$ of the at least one wireless communication device, and
    wherein the second data structure comprises an identity $id_i$ of the at least one wireless communication device; and
    a processor configured to derive the key $k_i$, of the at least one wireless communication device on the basis of the second data structure and to authenticate the at least one wireless communication device on the basis of the key $k_i$, and of the first data structure of the at least one wireless communication device;
    wherein the processor is further configured to device the key $k_i$, of the at least one wireless communication device on the basis of the following equation:

$$k_i = H'(e(H(id_{BS})^s, H(id_i)), r)$$

wherein r is the token H' and H are cryptographic hash functions, $id_{BS}$ is at an identity of the base station, and s is a master key.

13. The base station of claim 12, wherein the processor is further configured to derive the key $k_L$ of the at least one wireless communication device on the basis of the following equation:

$$k_i = tR + tH(R, id_i)Y,$$

wherein t is an integer, P is a public parameter, tP is the token, (x, (P, Y=xP)) is a key pair, $s = r + xH(R, id_i)$, H is a cryptographic hash function, and $r \in_R Z_q^*$, R=rP.

14. The base station of claim 12, wherein the processor is further configured to derive the key $k_i$ of the at least one wireless communication device on the basis of the following equation:

$$k_i = H'(s'R + s'H(R, id_i)Y, t),$$

wherein (R, s) is a private key of the at least one wireless communication device, (R', s') is a private key of the base station, t is the token, $r \in_R Z_q^*$, R=rP, (x, (P, Y=xP)) is a key pair, $s = r + xH(R, id_i)$, and H' and H are cryptographic hash functions.

* * * * *

UNITED STATES PATENT AND TRADEMARK OFFICE
CERTIFICATE OF CORRECTION

PATENT NO. : 11,039,308 B2
APPLICATION NO. : 16/577842
DATED : June 15, 2021
INVENTOR(S) : Quaglia et al.

It is certified that error appears in the above-identified patent and that said Letters Patent is hereby corrected as shown below:

On the Title Page

Foreign Application Priority Data (30): "Mar. 20, 2017 (EP)......................17161898" should read -- Mar. 20, 2017 (EP).......................17161898.6 --.

Signed and Sealed this
Second Day of August, 2022

Katherine Kelly Vidal
*Director of the United States Patent and Trademark Office*